United States Patent
Tsai et al.

(10) Patent No.: US 7,853,542 B2
(45) Date of Patent: Dec. 14, 2010

(54) METHOD FOR GRID-BASED DATA CLUSTERING

(75) Inventors: Cheng-Fa Tsai, Pingtung (TW); Chia-Chen Yen, Taipei (TW)

(73) Assignee: National Pingtung University of Science and Technology, Neipu Hsiang (TW)

( * ) Notice: Subject to any disclaimer, the term of this patent is extended or adjusted under 35 U.S.C. 154(b) by 582 days.

(21) Appl. No.: 11/958,461

(22) Filed: Dec. 18, 2007

(65) Prior Publication Data

US 2008/0154942 A1    Jun. 26, 2008

(30) Foreign Application Priority Data

Dec. 22, 2006    (TW) .............................. 95148370 A

(51) Int. Cl.
*G06F 17/00*    (2006.01)
*G06N 5/00*    (2006.01)

(52) U.S. Cl. ...................................................... 706/45
(58) Field of Classification Search ................... 706/45
See application file for complete search history.

(56) References Cited

U.S. PATENT DOCUMENTS

| | | | | |
|---|---|---|---|---|
| 6,882,997 | B1 * | 4/2005 | Zhang et al. ................. | 707/737 |
| 7,080,063 | B2 * | 7/2006 | Campos et al. ..................... | 1/1 |
| 7,174,336 | B2 * | 2/2007 | Campos et al. ..................... | 1/1 |
| 7,174,343 | B2 * | 2/2007 | Campos et al. ............. | 707/737 |
| 7,174,344 | B2 * | 2/2007 | Campos et al. ..................... | 1/1 |
| 7,272,787 | B2 * | 9/2007 | Nakamura et al. ........... | 715/234 |
| 7,542,951 | B1 * | 6/2009 | Chakrabarti et al. .......... | 706/45 |
| 7,584,159 | B1 * | 9/2009 | Chakrabarti et al. .......... | 706/45 |
| 7,590,642 | B2 * | 9/2009 | Campos et al. ..................... | 1/1 |
| 7,747,624 | B2 * | 6/2010 | Campos et al. ............. | 707/737 |

OTHER PUBLICATIONS

Lila: A Connected Components Labeling Algorithm in Grid-Based Clustering, Tao Jiang; Ming Qiu; Jie Chen; Xue Cao; Database Technology and Applications, 2009 First International Workshop on Digital Object Identifier: 10.1109/DBTA.2009.144 Publication Year: 2009 , pp. 213-216.*

The kernel recursive least-squares algorithm, Engel, Y.; Mannor, S.; Meir, R.; Signal Processing, IEEE Transactions on vol. 52 , Issue: 8 Digital Object Identifier: 10.1109/TSP.2004.830985 Publication Year: 2004 , pp. 2275-2285.*

(Continued)

*Primary Examiner*—Michael Holmes
(74) *Attorney, Agent, or Firm*—Alan Kamrath; Kamrath & Associates PA

(57) ABSTRACT

A method for grid-based data clustering comprises: creating a feature space having a plurality of cubes by a computer and showing the feature space by an interface of the computer, disposing a plurality of data stored in a database into the cubes, and then defining a plurality of the cubes as populated cubes; identifying whether the data within each of the populated cubes being evenly distributed or not to define each populated cube as a major cube or minor cube; combining border data of the minor cubes with the data in the major cubes; and designating all the data combined with each other as in the same cluster and recursively processing the above procedures to cluster all the data stored in the database.

9 Claims, 8 Drawing Sheets

OTHER PUBLICATIONS

OCR in a hierarchical feature space, Jaehwa Park; Govindaraju, V.; Srihari, S.N.; Pattern Analysis and Machine Intelligence, IEEE Transactions on vol. 22 , Issue: 4 Digital Object Identifier: 10.1109/34.845383 Publication Year: 2000 , pp. 400-407.*

Novel multi-class feature selection methods using sensitivity analysis of posterior probabilities, Kai-Quan Shen; Chong-Jin Ong; Xiao-Ping Li; Wilder-Smith, E.; Systems, Man and Cybernetics, 2008. SMC 2008. IEEE International Conference on Digital Object Identifier: 10.1109/ICSMC.2008.4811431 Publication Year: 2008, pp. 1116-1121.*

* cited by examiner

METHOD FOR GRID-BASED DATA CLUSTERING

BACKGROUND OF THE INVENTION

1. Field of the Invention

The present invention relates to a method for grid-based data clustering to create a feature space, which has a plurality of cubes, by a computer to obtain an optimal result of data clustering through an operation incorporated with density-based and grid-based algorithms.

2. Description of the Related Art

Generally, "data mining" is primarily utilized in the field of data management to establish a data-analyzing model for identifying concealed features of and relationships between the data within a database. Said established data-analyzing model is suitable for several applications, such as analyses of commercial transaction, position distribution, file management, and network intrusion, so that a user can explore covered and useful information as reference sources. There are six kinds of techniques for data mining, which are clustering, classification, association, time-series, regression, and sequence, with the clustering technique being most popular in present use. Moreover, the clustering technique also has several branches, such as partitioning operation, hierarchical operation, density-based operation, and grid-based operation. However, in execution, there are some drawbacks to each of said clustering techniques as the following.

First, regarding to the partitioning operation, it is processed by steps of: determining a center of all data within a database; verifying distances between the data; and clustering the data according to the verified distances. Representative algorithms for the partitioning operation are K-means, PAN, CLARA, CLARANS etc. Although the conventional partitioning operation is powerful in clustering speed, the result of clustering is unstable and the noise data are not filtered out.

Second, regarding to the hierarchical operation, it is processed by pre-constructing a tree-like hierarchical structure and thereby decomposing the data within the database, with the tree-like hierarchical structure being build through agglomerative approach or division approach. Through the agglomerative approach, the clustering result can be obtained by combining parts of the data bottom-up; through the division approach, the clustering result can be obtained by iteratively decomposing the data top-down. Representative algorithms for the agglomerative approach are BRICH, CURE, ROCK etc, and representative algorithm for the divisive approach is CHAMELEON. However, the conventional hierarchical operation has to compare the similarity of data during combination or decomposition, which may easily cause a large amount of executing time.

Third, regarding to the density-based operation, it is processed by clustering the data in accordance with the data density of an area. For example, if the data density of an area meets the predetermined criteria, a search will be executed and extended from the area, and other areas meeting the criteria will be combined, so as to form the clustering result. Representative algorithms for the density-based operation are DBSCAN, IDBSCAN, GDBSCAN etc. Said density-based operation can detect irregular figure and filter out noise data efficiently, but it also causes a large amount of executing time.

Finally, regarding to the grid-based operation, it is processed by creating a feature space to illustrate the data within the database, dividing the feature space into a plurality of grids, and then combining adjacent grids in accordance with analysis results of the data within each grid, so as to obtain the clustering result. Moreover, instead of the datum in each grid, the minimum unit to be clustered is the grid within the feature space. Representative algorithms for the grid-based operation are STING, CLIQUE etc. The clustering speed of the conventional grid-based operation is fast due to the minimum clustered unit being a grid. However, the rectangle-shaped grids can result in imprecise clustering result or pattern with jagged edge.

Accordingly, in the conventional clustering techniques, there are several problems, such as long executing time, existence of noise data, and imprecise clustering results. Therefore, for practicability, how to maintain the advantages of and expel the drawbacks from the conventional clustering techniques is an important topic over the relative technique field. Hence, there is a need of improving the conventional clustering techniques.

SUMMARY OF THE INVENTION

The primary objective of this invention is to provide a method for grid-based data clustering, which creates a feature space having a plurality of cubes by a computer and then identifies the data density of each cube, so as to define a plurality of populated cubes. Consequently, the rounds for iterative searches are decreased, and thereby, the effect of clustering is increased.

The secondary objective of this invention is to identify whether the data within the populated cubes are evenly distributed by telling a discrete degree of the data. The populated cubes are categorized into major cubes or minor cubes thereby, and the data within said cubes are incorporated into a clustering result. Consequently, the jagged edge of obtained pattern is erased.

The method for grid-based data clustering in accordance with an aspect of the present invention includes the steps of: creating a feature space having a plurality of cubes by a computer and showing the feature space by an interface of the computer, disposing a plurality of data stored in a database into the cubes, and then defining a plurality of the cubes as populated cubes; identifying whether the data within each of the populated cubes being evenly distributed or not to define each populated cube as a major cube or minor cube; combining border data of the minor cubes with the data in the major cubes; and designating all the data combined with each other as in the same cluster and recursively processing the above procedures to cluster all the data stored in the database.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
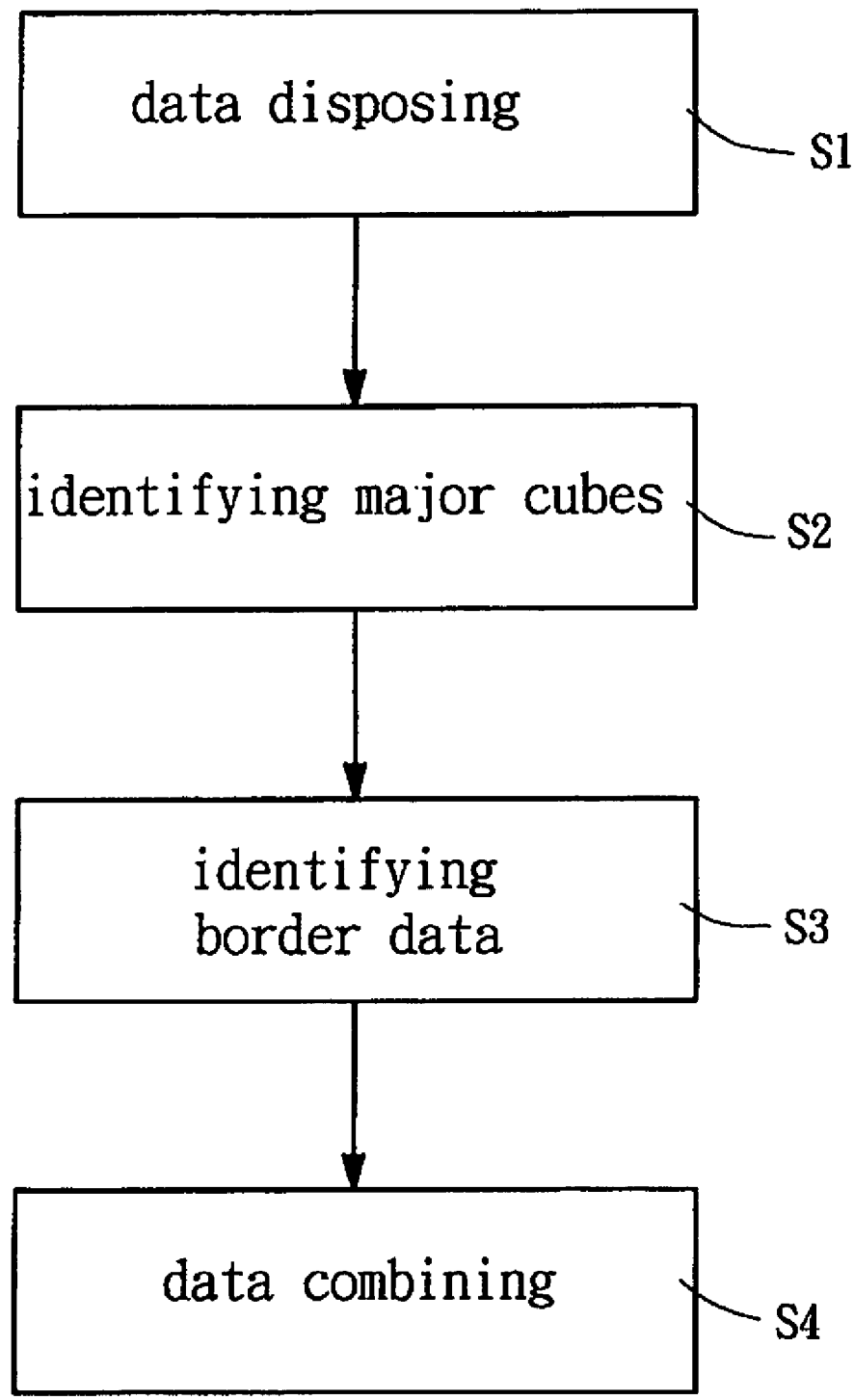
FIG. 1 is flow chart illustrating a method for grid-based data clustering in accordance with a preferred embodiment of the present invention.
Figure 2:
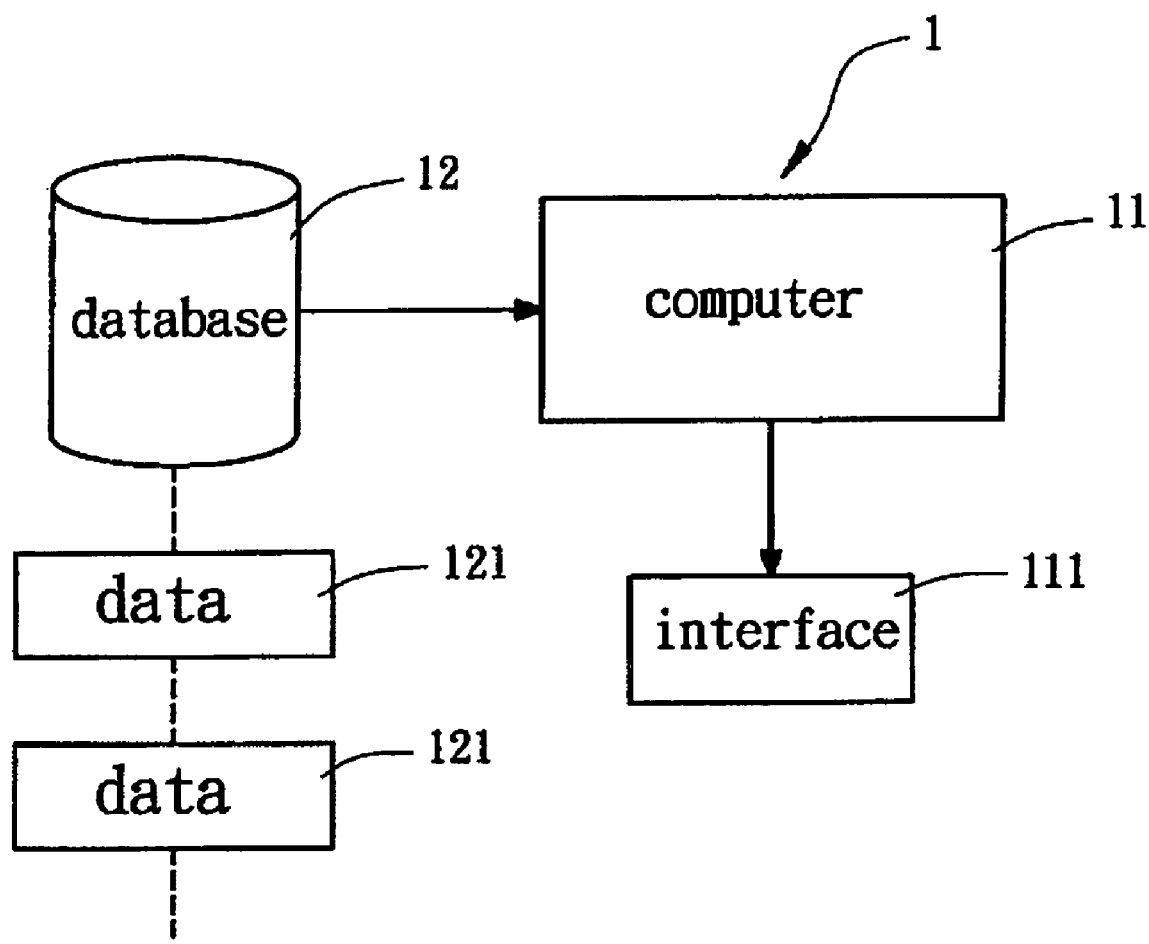
FIG. 2 is a block diagram illustrating a system for a method for grid-based data clustering in accordance with a preferred embodiment of the present invention.

Please referring to FIGS. 1 and 2, in accordance with a preferred embodiment of the present invention, a data clustering system 1 comprising a computer 11 and at least one database 12 is provided previously. The computer 11 connects to the database 12, which stores a plurality of data 121 in advance, such that the computer 11 retrieves the data 121 stored in the database 12 for data clustering. Furthermore, the computer 11 has an interface 111 for visualizing and showing a result of the data clustering. Steps of the proposed method for grid-based data clustering include "data disposing", "identifying major cubes", "identifying border data" and "data combining", which are designated as S1 to S4 in sequence and processed by the data clustering system 1, so as to perform the data clustering efficiently and accurately.

Figure 3:
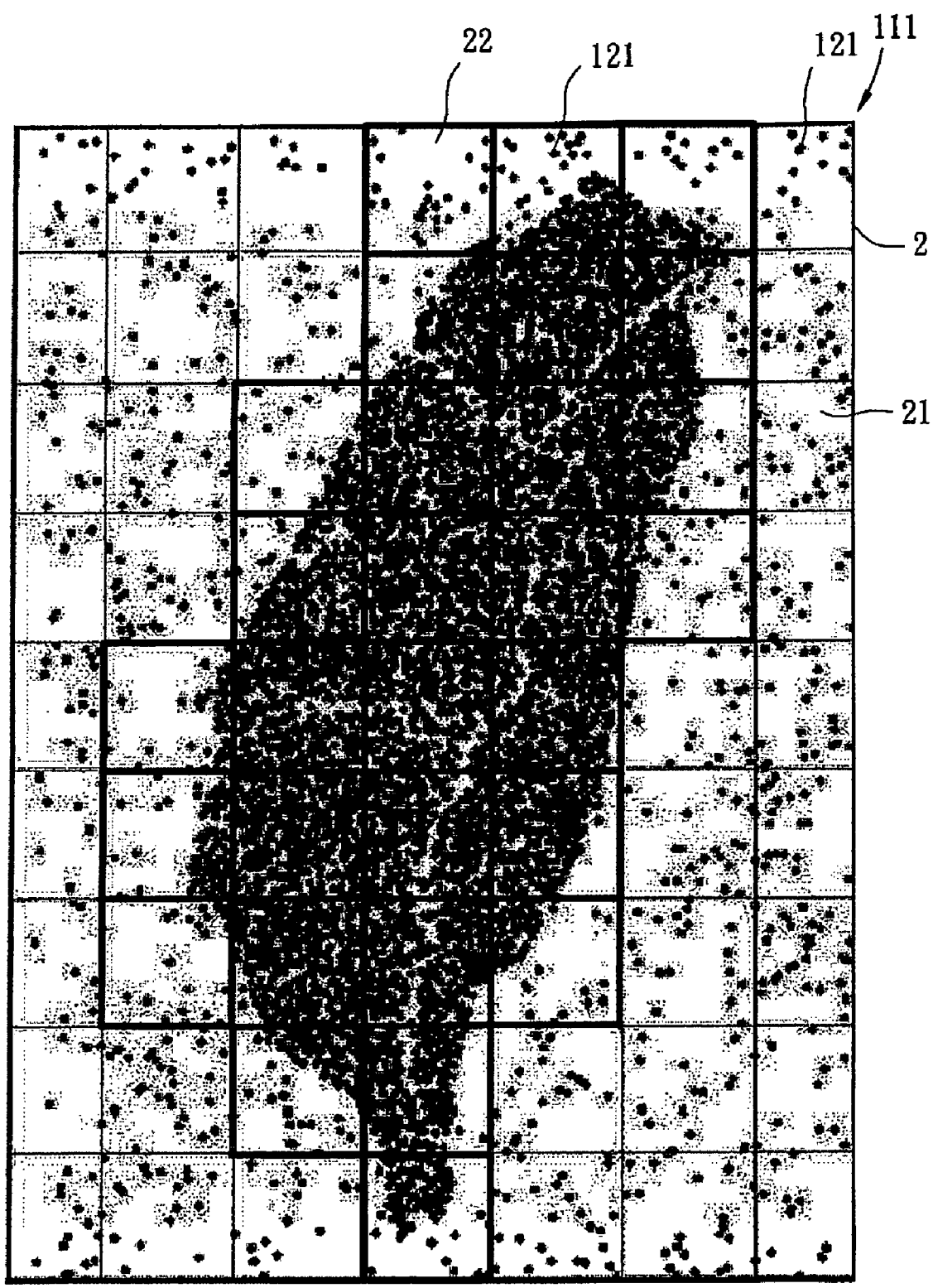
FIG. 3 is a schematic view of a result in accordance with a preferred embodiment of the present invention after a "data disposing" step is just performed.

Referring now to FIGS. 1 to 3, in step S1, the "data disposing" step, a feature space 2 is created and is shown by the interface 111 of the computer 11 previously. The feature space 2 is then divided into a plurality of cubes 21 after a cube size is inputted into the computer 11, wherein the cube 21 is a grid in two-dimension or a small space in "n"-dimension with the "n" being larger than two. After that, the computer 11 retrieves the data 121 stored in the database 12 and disposes the data 121 into corresponding cubes 21 according to some specific features of the data 121, and the data 121 therefore form at least one cluster in the feature space 2. Through the computer 11, a predetermined value is designated as a threshold value of density, wherein the predetermined value is preferably an integer. Thereby, the computer 11 distinguishes the cubes 21 having data densities higher than the threshold value from those having data densities lower than the threshold value, wherein the data density of the cube 21 is in direct proportion to the amount of data 121 disposed therein. The cubes 21 with their data densities being higher than the threshold value are defined as populated cubes 22, which are shown as those cubes with thick sidelines in FIG. 3. As a result, the data 121 in the cubes 21 with their data densities being lower than the threshold value, which are shown with thin sidelines in FIG. 3, are excluded.

In order to identify one of the populated cubes 22 as a "density attractor" to be a start point for searching in coming procedures, a density function relative to the amount of data 121 in each populated cube 22 is utilized, so as to obtain dense-values, which are the solutions of the density function over respective populated cubes 22. Said density function is a summation of a plurality of influence functions, and the influence function, which is preferably defined by "Euclidean distance formula" and "Gaussian expression", is utilized to estimate the influence raised by a datum 121 upon the other data 121. Thereby, the density function can be shown as the following:

$$f_{Gauss}^{D}(x) = \sum_{i=1}^{N} e^{\frac{d(x,x_i)^2}{2\sigma^2}}.$$

Regarding to the density function, the "N" denotes a total of the data 121 contained in respective populated cube 22; the "$d(x,x_i)$" denotes an Euclidean distance between the datum 121 and one of the other data 121; and the "σ" denotes a standard deviation. In detail, the main idea of the density function is that: the farther a datum 121 is from the other data 121, the higher a degree of apartness of the datum 121 is, and the less data 121 surround the datum 121, such that the density near the datum 121 is lower. As a result, if the dense-value of one of the populated cubes 22 is higher than that of all the other populated cubes 22, the density of the data 121 within the populated cube 22 must be the largest. Consequently, said populated cube 22 can be regarded as the density attractor.

Figure 4:
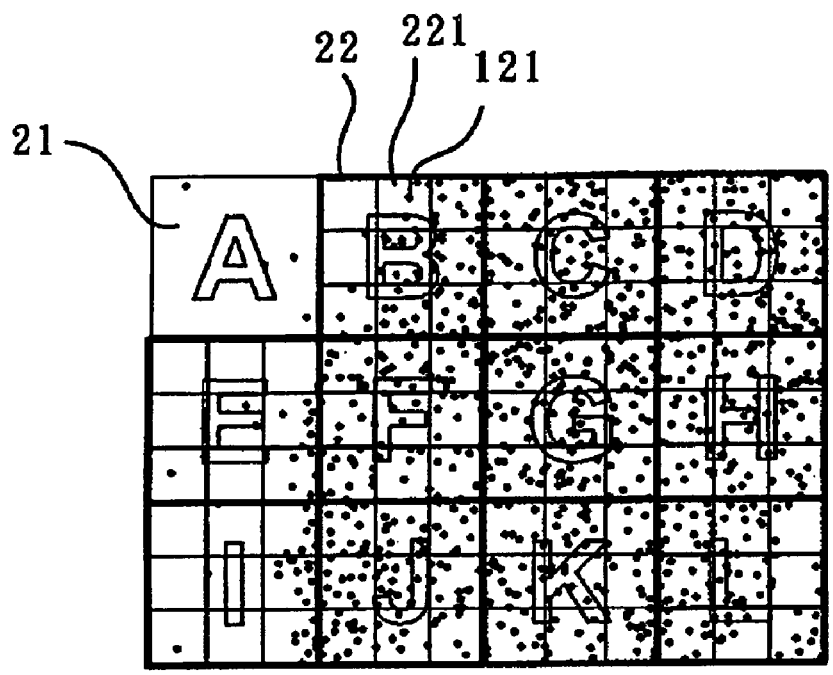
FIG. 4 is a schematic view of a result in accordance with a preferred embodiment of the present invention after a "identifying major cubes" step is just performed.

Referring now to FIGS. 1, 2 and 4, in step S2, the "identifying major cubes" step, the computer 11 identifies whether the data 121 within the populated cubes 22 are evenly distributed or not by a discrete degree of the data 121. If the data 121 in a populated cube 22 is evenly distributed, the populated cube 22 is defined as a "major cube"; however, if the data 121 in a populated cube 22 is unevenly distributed, the populated cube 22 is defined as a "minor cube". As a result, the major cubes are at body positions of the at least one cluster, and the minor cubes are at edge positions thereof.

The discrete degree of the data 121 within one of the populated cubes 22 is acquired as the following steps: dividing the populated cube 22 into a plurality of sub-cubes 221, and then identifying whether the number of the data 121 in each sub-cube 221 falls into a predetermined range or not. If the number of the data 121 is in the predetermined range, the discrete degree of the data 121 is identified as good, and the populated cubes 22 is evenly distributed; otherwise, the discrete degree is identified as bad, and the populated cubes 22 is unevenly distributed. For example, as shown in FIG. 4, the populated cube 22 is divided into nine sub-cubes 221, and a upper limit and a lower limit define the predetermined range, which are designated as UL and LL and are clarified as $UL=(n/9)*(1+PTV)$, $LL=(n/9)*(1-PTV)$, wherein the "n" denotes the amount of the data 121 within the populated cube 22, and the "PTV" denotes a percentage of tolerance value. Therefore, when all the numbers of the data 121 within the nine sub-cubes 221 of the populated cube 22 are between the upper and lower limits, the populated cube 22 is defined as a major cube; otherwise, the cube 22 is defined as a minor cube. Accordingly, the populated cubes 22 designated as "C", "D", "F", "G", "H", "J", and "K" are major cubes, and the populated cubes 22 designated as "B", "4E", "I", and "L" are minor cubes.

Figure 5:
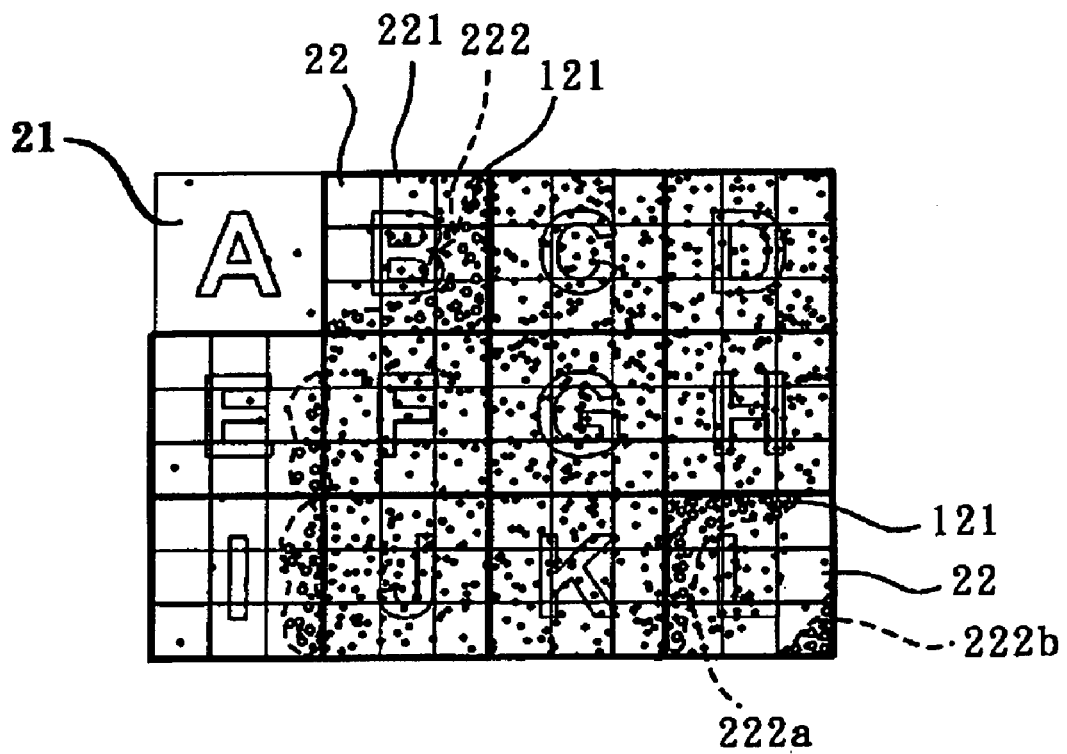
FIG. 5 is a schematic view of a result in accordance with a preferred embodiment of the present invention after a "identifying border data" step is just performed.

Referring now to FIGS. 1, 2 and 5, in step S3, the "identifying border data" step, the computer 11 detects the populated cubes 22 defined as minor cubes in detail by a clustering method, for instance, a clustering method with a density-based algorithm, preferably the DBSCAN algorithm. Within each minor cube such as those designated as "B", "E", "I", and "L" in FIG. 5, at least one sub-cluster 222 is created, with said sub-cluster 222 including a plurality of "border data" that are disposed near borders of each minor cube. After that, the data 121 in the at least one sub-cluster 222 are then compared with those in the populated cubes 22 defined as major cubes.

And the data 121 respectively disposed in the sub-cluster 222 and the major cubes can combine with each other if they have similar features, that is, they are adjacent to each other in the feature space 2. For example, if a populated cube 22 such as the one designated as "L" in FIG. 5 includes two sub-clusters 222*a*, 222*b*, with the sub-cluster 222*a* being adjacent to the populated cubes 22 defined as major cubes, the data 121 disposed in the sub-cluster 222*a* will be combined with those in the major cubes.

Please referring to FIGS. 1 and 2 again, in the last step S4, the "data combining" step, all the data 121 combined with each other are designated in the same cluster. Besides, steps S1 through S4 are recursively processed, so as to complete the work for data clustering over the entire data 121 in the database 12.

Figure 6:
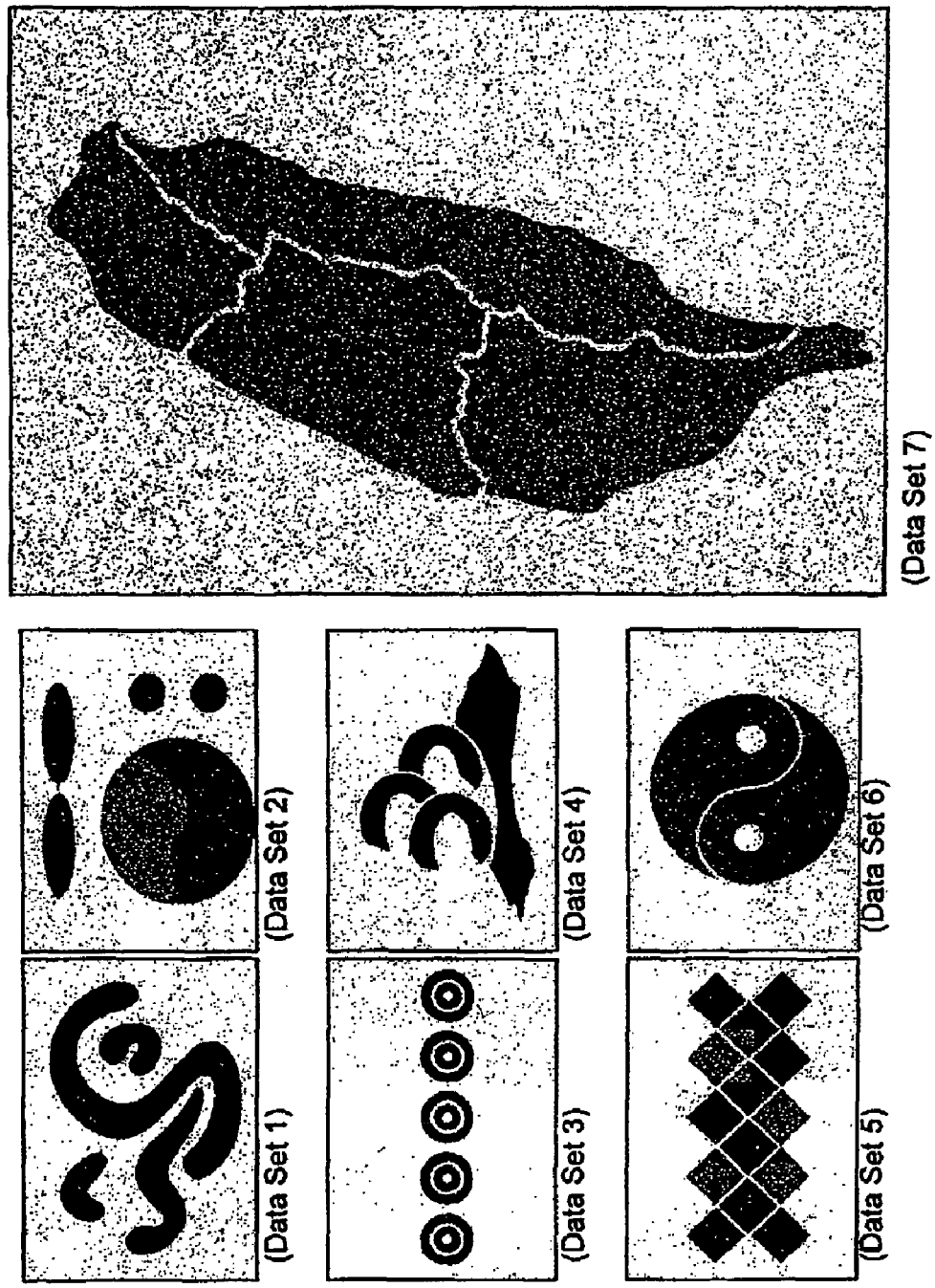
FIG. 6 is a schematic view of data clustering results of various examples in accordance with a conventional K-means algorithm.
Figure 7:
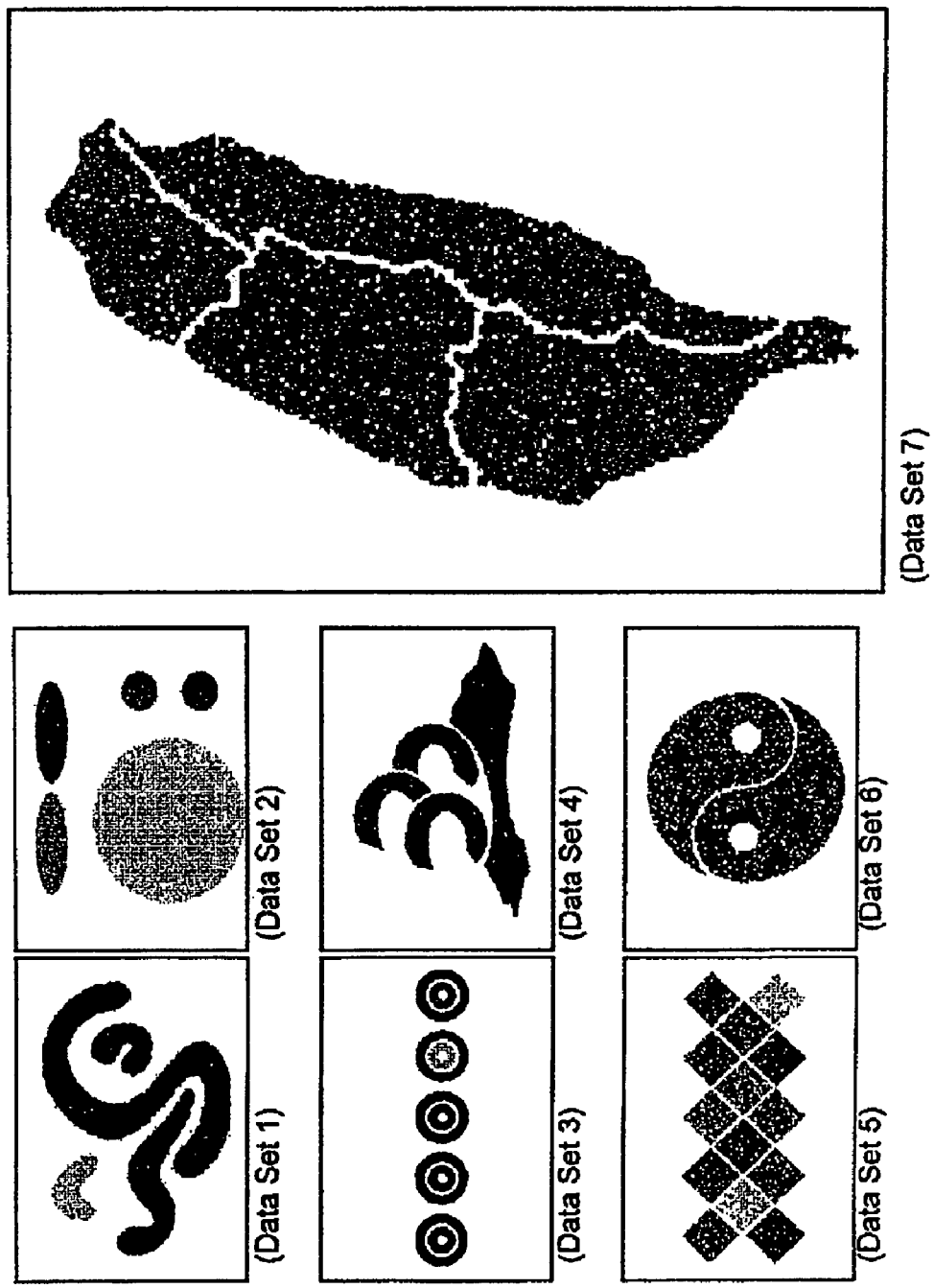
FIG. 7 is a schematic view of data clustering results of said various examples in accordance with a conventional CLIQUE algorithm.
Figure 8:
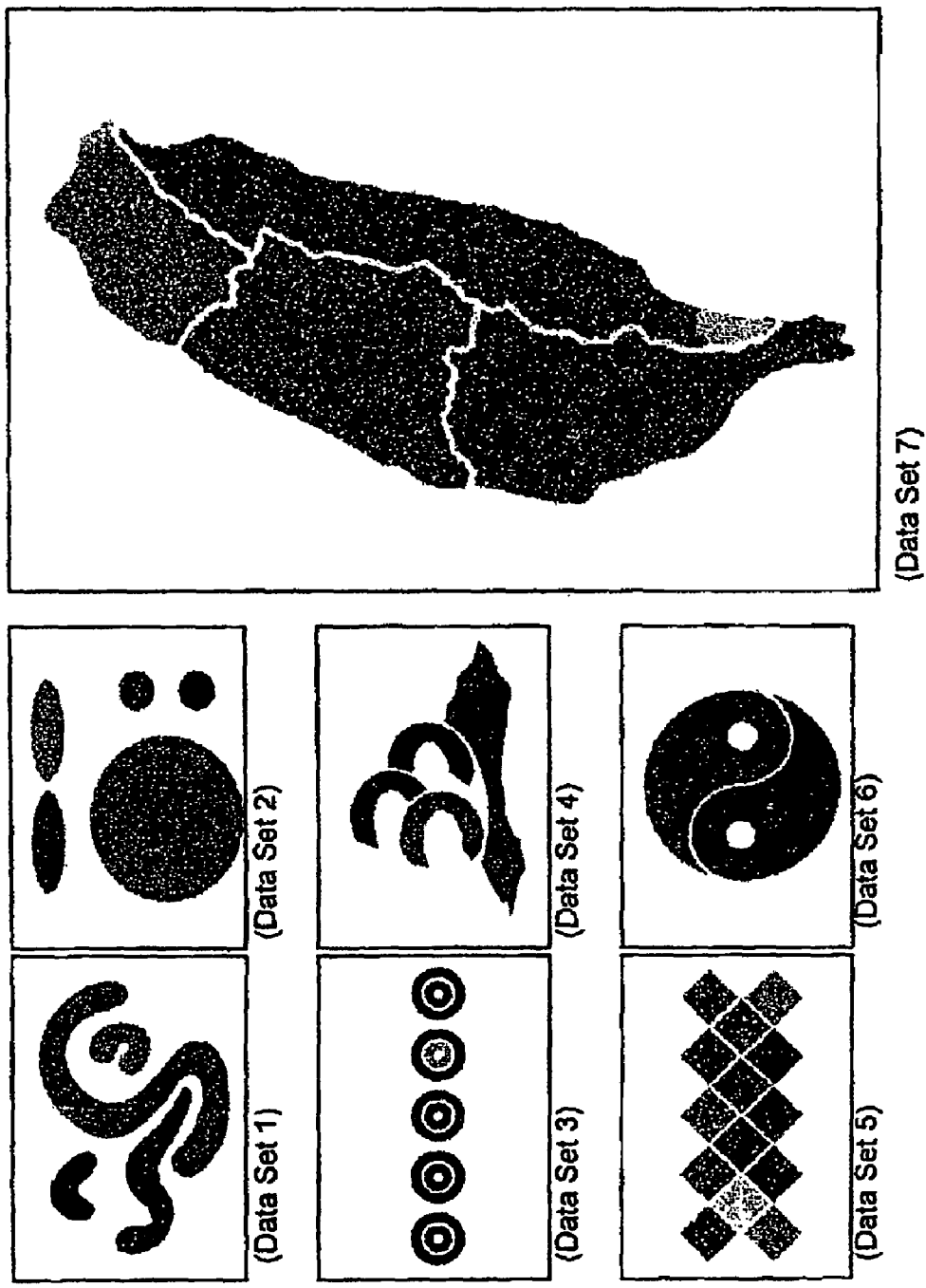
FIG. 8 is a schematic view of data clustering results of said various examples in accordance with a conventional GDH algorithm.
Figure 9:
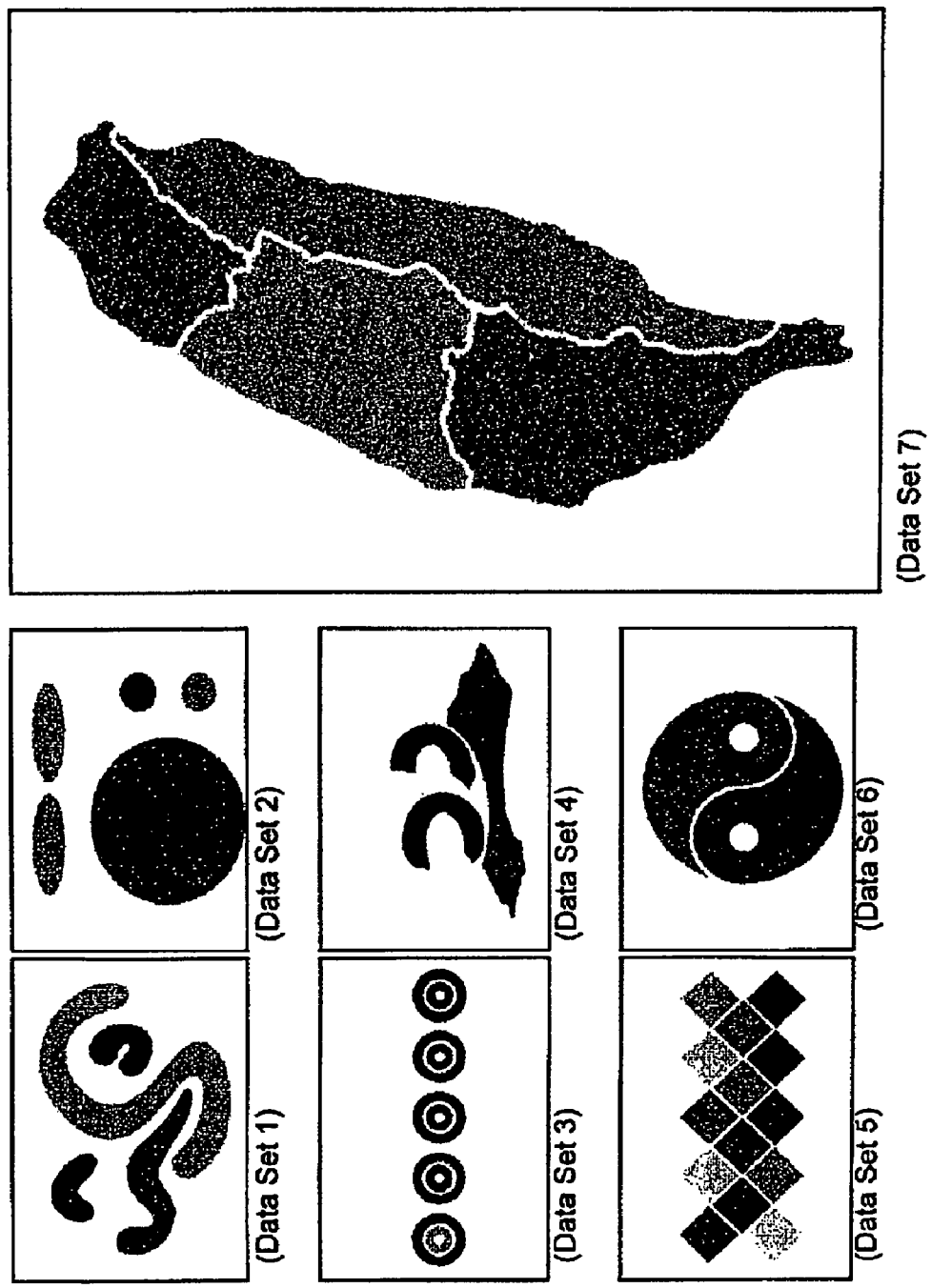
FIG. 9 is a schematic view of data clustering results of said various examples in accordance with a preferred embodiment of the present invention.

Referring to FIGS. 6 to 9 now, several schematic views of data clustering results generated by tests on the present invention and plural conventional data clustering methods are shown, wherein the conventional data clustering methods include K-means algorithm, CLIQUE algorithm, and GDH algorithm. The gray grounds of the FIG. 6 are caused by the unfiltered noise data of the results of the conventional data clustering method using said K-means algorithm. Moreover, Tables 1 to 4, which are about comparisons between the present invention, the conventional DBSCAN algorithm and the above mentioned conventional data clustering methods, are shown for illustrations over executing time cost (TC), clustering correctness rate (CCR), and noise-filtered rate (NFR).

Two variables, which are the size of a database and a pattern connoted by the data within, are applied in the tests. Regarding to the first variable, the size of a database, it is selected from 11,500, 115,000, 230,000 and 575,000 data included, with Table 1 corresponding to 11,500 data, Table 2 corresponding to 115,000 data and so on, and 15 percents of the data are noise data. Regarding to the second variable, there are seven various patterns going to be shown through the interface 111 after the data clustering is processed. Therefore, there are seven data sets in each Table, which are designated as data set 1 to data set 7 and connote said seven various patterns respectively.

In order to execute the data clustering procedures for the tests, the computer 11 comprises a CPU of Intel Pentium 4 with a frequency of 1.5 GHz, a random-access memory (RAM) with 256 Mbytes, and a Java computer program, so as to realize all the said data clustering methods. The Tables 1 to 4 and discussion about the revealed information thereof are shown as the following.

TABLE 1

11,500 data

|  |  | Data Set 1 | Data Set 2 | Data Set 3 | Data Set 4 | Data Set 5 | Data Set 6 | Data Set 7 |
|---|---|---|---|---|---|---|---|---|
| K-means | TC | 0.344 | 0.75 | 0.375 | 0.5 | 1.016 | 0.297 | 0.406 |
|  | CCR | 52.839 | 57.8 | 47.19 | 58.98 | 88.09 | 49.43 | 44.79 |
|  | NFR | 0 | 0 | 0 | 0 | 0 | 0 | 0 |
| CLIQUE | TC | 1.031 | 0.797 | 2.594 | 2.235 | 2.171 | 2.375 | 2.125 |
|  | CCR | 98.09 | 97.78 | 88.92 | 76.49 | 75.13 | 80.14 | 74.119 |
|  | NFR | 93 | 94.333 | 98.2 | 99.066 | 97.483 | 96.4 | 98.8 |
| DBSCAN | TC | 33.969 | 33.891 | 34.078 | 34.328 | 33.954 | 32.39 | 33.234 |
|  | CCR | 99.29 | 99.68 | 99.99 | 99.24 | 99.57 | 98.83 | 99.81 |
|  | NFR | 94.6 | 94.333 | 95.866 | 97.8 | 94.304 | 96.066 | 97.133 |
| GDH | TC | 0.844 | 0.75 | 2.188 | 2.266 | 2.25 | 1.75 | 2.047 |
|  | CCR | 97.119 | 97.78 | 88.92 | 76.49 | 75.13 | 88.42 | 98.8 |
|  | NFR | 93.933 | 94.333 | 98.2 | 99.066 | 97.483 | 95.8 | 72.899 |
| Present invention | TC | 0.797 | 0.875 | 1.016 | 1.078 | 1.203 | 0.859 | 0.781 |
|  | CCR | 98.41 | 99 | 98.65 | 98.87 | 97.5 | 98.1 | 98.55 |
|  | NFR | 94.133 | 93.333 | 96.333 | 96.2 | 94.569 | 98 | 98.133 |

According to Table 1, the time cost of K-means algorithm is short, but said algorithm is short on noise filtering; and DBSCAN algorithm provides an ideal clustering correctness rate, but it takes too much time for execution. Owing to the small size of the database, the differences between the present invention, CLIQUE algorithm and GDH algorithm are not clear.

TABLE 2

115,000 data

|  |  | Data Set 1 | Data Set 2 | Data Set 3 | Data Set 4 | Data Set 5 | Data Set 6 | Data Set 7 |
|---|---|---|---|---|---|---|---|---|
| K-means | TC | 2.75 | 4.844 | 0.375 | 0.5 | 1.016 | 0.297 | 0.406 |
|  | CCR | 52.979 | 52.759 | 47.19 | 58.98 | 88.09 | 49.43 | 44.79 |
|  | NFR | 0 | 0 | 0 | 0 | 0 | 0 | 0 |
| CLIQUE | TC | 1.703 | 4.109 | 2.594 | 2.235 | 2.171 | 2.375 | 2.125 |
|  | CCR | 98.062 | 99.014 | 88.92 | 76.49 | 75.13 | 80.14 | 74.119 |
|  | NFR | 96.726 | 98.306 | 98.2 | 99.066 | 97.483 | 96.4 | 98.8 |
| DBSCAN | TC | 11465.96 | N/A | N/A | N/A | N/A | N/A | N/A |
|  | CCR | 100 | N/A | N/A | N/A | N/A | N/A | N/A |
|  | NFR | 93.14 | N/A | N/A | N/A | N/A | N/A | N/A |

TABLE 2-continued 115,000 data

| | | Data Set 1 | Data Set 2 | Data Set 3 | Data Set 4 | Data Set 5 | Data Set 6 | Data Set 7 |
|---|---|---|---|---|---|---|---|---|
| GDH | TC | 1.906 | 4.515 | 7.063 | 21.109 | 28.016 | 17.703 | 26.609 |
| | CCR | 98.779 | 99.572 | 97.342 | 98.051 | 88.293 | 88.215 | 72.362 |
| | NFR | 95.846 | 97.573 | 98.906 | 99.326 | 98.958 | 99.693 | 99.753 |
| Present | TC | 1.64 | 2.75 | 4.421 | 5.187 | 8.39 | 12.14 | 10.484 |
| invention | CCR | 98.818 | 99.012 | 99.39 | 99.019 | 97.009 | 98.383 | 97.693 |
| | NFR | 95.966 | 98.486 | 98.626 | 98.806 | 97.679 | 99.16 | 99.16 |

According to Table 2, the size of the databases, namely the amount of data within each of the databases, is too large for the DBSCAN algorithm, so that some testing results are represented by "N/A", and the present invention performs better than other conventional data clustering methods. It is obvious that the present invention provides a performance better than other methods especially in the data sets connoting complex or detailed pattern, such as data sets 3 to 7.

TABLE 3

230,000 data

| | | Data Set 1 | Data Set 2 | Data Set 3 | Data Set 4 | Data Set 5 | Data Set 6 | Data Set 7 |
|---|---|---|---|---|---|---|---|---|
| K-means | TC | 8.406 | 13.782 | 9.718 | 20.829 | 23.891 | 2.75 | 7.344 |
| | CCR | 50.032 | 56.241 | 51.144 | 58.108 | 84.982 | 49.957 | 59.056 |
| | NFR | 0 | 0 | 0 | 0 | 0 | 0 | 0 |
| CLIQUE | TC | 2.578 | 5.203 | 8.703 | 24.203 | 40.078 | 20.688 | 39.656 |
| | CCR | 97.934 | 99.64 | 95.862 | 96.619 | 90.951 | 89.486 | 94.157 |
| | NFR | 96.663 | 97.473 | 99.266 | 99.676 | 99.212 | 99.686 | 99.666 |
| DBSCAN | TC | N/A | N/A | N/A | N/A | N/A | N/A | N/A |
| | CCR | N/A | N/A | N/A | N/A | N/A | N/A | N/A |
| | NFR | N/A | N/A | N/A | N/A | N/A | N/A | N/A |
| GDH | TC | 3.453 | 5.875 | 8.985 | 25.969 | 43.547 | 16.672 | 19.172 |
| | CCR | 99.031 | 99.712 | 98.009 | 98.642 | 93.244 | 97.791 | 94.431 |
| | NFR | 96.036 | 97.406 | 98.766 | 99.256 | 99.077 | 99.283 | 99.336 |
| Present | TC | 2.734 | 3.782 | 6.828 | 7.219 | 9.813 | 9.922 | 11.875 |
| invention | CCR | 98.584 | 99.688 | 99.127 | 99.744 | 99.505 | 99.458 | 99.6 |
| | NFR | 96.453 | 97.46 | 98.623 | 98.87 | 96.359 | 98.926 | 98.73 |

TABLE 4

575,000 data

| | | Data Set 1 | Data Set 2 | Data Set 3 | Data Set 4 | Data Set 5 | Data Set 6 | Data Set 7 |
|---|---|---|---|---|---|---|---|---|
| K-means | TC | 18.531 | 16.391 | 59.437 | 43.203 | 77.297 | 7.828 | 19.906 |
| | CCR | 49.925 | 51.149 | 60.837 | 57.612 | 87.711 | 50.007 | 54.49 |
| | NFR | 0 | 0 | 0 | 0 | 0 | 0 | 0 |
| CLIQUE | TC | 5.016 | 8.031 | 12.281 | 30.094 | 47.984 | 31.219 | 46 |
| | CCR | 98.763 | 99.104 | 95.926 | 97.274 | 89.552 | 95.647 | 93.547 |
| | NFR | 95.92 | 98.149 | 99.305 | 99.608 | 99.387 | 99.79 | 99.805 |
| DBSCAN | TC | N/A | N/A | N/A | N/A | N/A | N/A | N/A |
| | CCR | N/A | N/A | N/A | N/A | N/A | N/A | N/A |
| | NFR | N/A | N/A | N/A | N/A | N/A | N/A | N/A |
| GDH | TC | 8.188 | 9.516 | 13.359 | 31.75 | 61.547 | 26.297 | 51.469 |
| | CCR | 99.213 | 99.642 | 98.299 | 98.153 | 96.162 | 96.456 | 96.4 |
| | NFR | 96.618 | 97.477 | 98.932 | 99.408 | 99.055 | 99.736 | 99.71 |
| Present | TC | 6.531 | 6.922 | 8.938 | 18.422 | 18.672 | 18.266 | 16.813 |
| invention | CCR | 99.221 | 99.104 | 98.109 | 99.873 | 99.478 | 99.77 | 98.145 |
| | NFR | 96.537 | 98.149 | 98.852 | 98.578 | 96.779 | 98.91 | 99.421 |

According to Tables 3 and 4, the performances of the present invention about the time cost and clustering correctness rate are greatly superior to those of CLIQUE algorithm or GDH algorithm when the data sets connote complex or detailed pattern. Moreover, the noise-filtered rate of the present invention is similar to that of those two algorithms.

As has been discussed above, there are several problems within the conventional data clustering methods, such as long executing time, existence of noise data, and imprecise clustering results. The present invention bases on the feature space 2, which is divided into a plurality of said cubes 21, and identifies some of the cubes 21 as the "major cubes" with their data densities being higher than the threshold value and the data 121 within these cubes 21 are evenly distributed. And the cubes 21 adjacent to the major cubes are further defined as the "minor cubes" and are detected in detail by a density-based algorithm, so as to combine the data 121 within the major and minor cubes according to the results of the detecting and obtain the data clustering result. Accordingly, the present invention can be utilized to identify the clusters formed by data with irregular features and within large-sized databases. Besides, the present invention can not only obtain the result of data clustering but also filter noise data indeed, reduce the time cost effectively, and raise the clustering correctness rate largely.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A method for grid-based data clustering, with the method comprising:

creating a feature space having a plurality of cubes by a computer and showing the feature space by an interface of the computer, with the computer retrieving a plurality of data stored in a database and disposing the data into the cubes, and then defining a plurality of the cubes as populated cubes according to the amount of data disposed in the cubes;

identifying whether the data within each of the populated cubes being evenly distributed or not, and defining the populated cubes having evenly distributed data as major cubes and those having unevenly distributed data as minor cubes;

detecting the minor cubes to search for border data disposed near borders of each minor cube, and then comparing said border data with the data in the major cubes to combine at least one of the border data with the data in the major cubes; and designating all the data combined with each other as in the same cluster and recursively processing the above procedures to cluster all the data stored in the database.

2. The method for grid-based data clustering as defined in claim 1, wherein the amounts of data disposed in the cubes are represented by data densities, with a threshold value of density being used to distinguish cubes having data densities higher than the threshold value from those having data densities lower than the threshold value, and the cubes having data densities higher than the threshold value are defined as said populated cubes.

3. The method for grid-based data clustering as defined in claim 1, wherein a dense-value, a solution of a density function, is utilized to represent the amount of data disposed in each populated cube, with the density function being defined as:

$$f_{Gauss}^{D}(x) = \sum_{i=1}^{N} e^{-\frac{d(x,x_i)^2}{2\sigma^2}},$$

wherein the "N" denotes a total of the data contained in the populated cube, the "$d(x,x_i)$" denotes an Euclidean distance between a datum and another datum thereof and the "$\sigma$" denotes a standard deviation;

wherein one of the populated cubes having the largest value of the density function is identified as a density attractor to be a start point for searching.

4. The method for grid-based data clustering as defined in claim 1, wherein the data within the populated cubes being evenly distributed or not is identified through a discrete degree of the data;

wherein the populated cube is identified as evenly distributed if the discrete degree is "good", and the populated cube is unevenly distributed if the discrete degree is identified as "bad".

5. The method for grid-based data clustering as defined in claim 4, wherein the discrete degree is acquired by dividing the populated cube into a plurality of sub-cubes and then identifying whether the number of the data in each sub-cube is within a predetermined range or not;

wherein the discrete degree is "good" if the numbers of the data of all the sub-cubes are within a predetermined range, and the discrete degree is "bad" if any one of those is out of the predetermined range.

6. The method for grid-based data clustering as defined in claim 5, wherein a upper limit and a lower limit defining the predetermined range are designated as UL and LL and are clarified as $UL=(n/9)*(1+PTV)$, $LL=(n/9)*(1-PTV)$, wherein the "n" denotes the amount of the data within the populated cube, and the "PTV" denotes a percentage of tolerance value.

7. The method for grid-based data clustering as defined in claim 1, wherein the minor cubes are detected by a clustering method to search for the border data, and at least one sub-cluster including a plurality of the border data is created for comparing said border data with the data in the major cubes.

8. The method for grid-based data clustering as defined in claim 7, wherein said clustering method detecting the minor cubes is a clustering method with a density-based algorithm.

9. The method for grid-based data clustering as defined in claim 8, wherein the density-based algorithm is DBSCAN algorithm.

* * * * *